April 30, 1929.  L. FERENCI  1,710,694
AUTOMATIC SLIP COUPLING
Filed Oct. 19, 1927
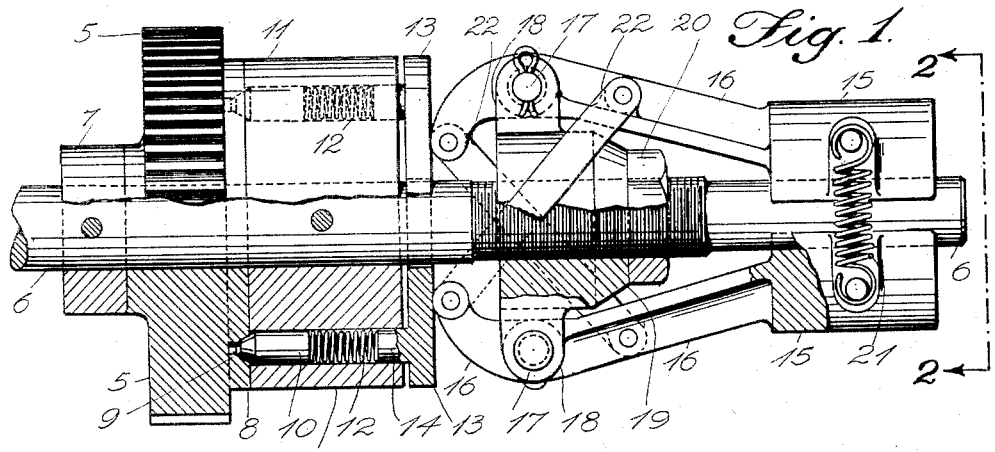
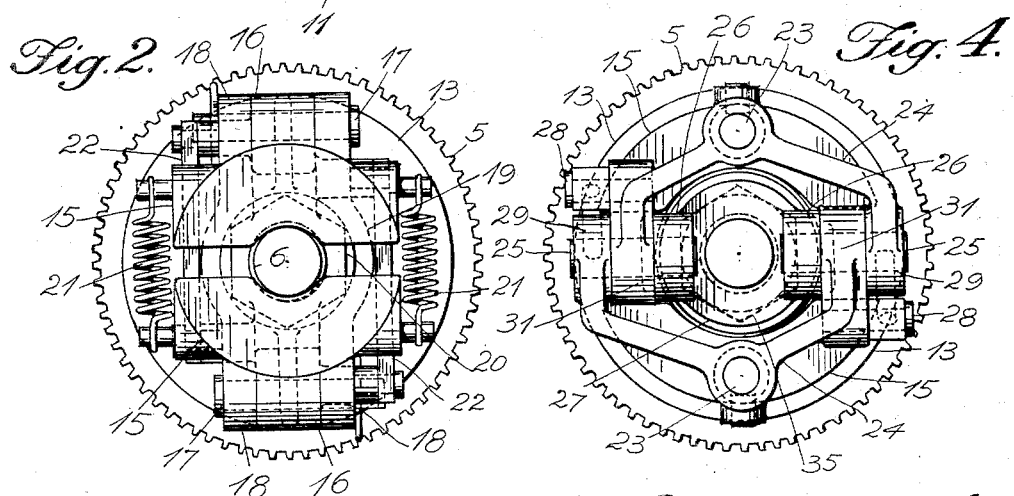
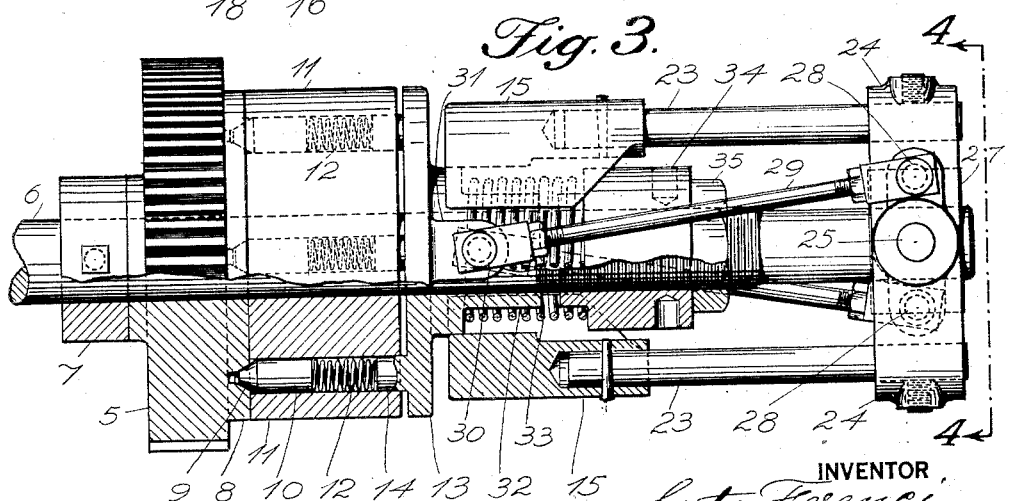
INVENTOR
Lester Ferenci
BY
Sydney Prescott
ATTORNEY Patented Apr. 30, 1929.

1,710,694

UNITED STATES PATENT OFFICE.

LESTER FERENCI, OF BROOKLYN, NEW YORK, ASSIGNOR TO AMERICAN MACHINE & FOUNDRY COMPANY, A CORPORATION OF NEW JERSEY.

AUTOMATIC SLIP COUPLING.

Application filed October 19, 1927. Serial No. 227,207.

This invention relates to an improved automatic slip coupling, particularly adapted for use in connection with automatic machinery, its object being to automatically release itself and stop the machine in case the load is suddenly increased by an abnormal condition in machine operation, and yet not release itself in starting the machine.

Couplings for this purpose are usually provided with springs which press the two members of the coupling into engagement but allow them to slip or disengage when the pressure for which the springs have been set is exceeded. But the starting torque of a machine is very much greater than its running torque and the slipping point of the coupling had to be determined in accordance with sufficient pressure to enable machine starting; consequently, the slipping pressure was usually so much in excess of the normal running pressure as to render the coupling imperfect as a safety device.

This defect is overcome in the present invention by combining the coupling with energizing means, as a centrifugal governor, for example, in such manner that the speed of the machine controls the spring pressure of the coupling. For this purpose, the flying weights of the governor are caused to control the springs of the coupling in such manner that, at rest, they exert maximum pressure, but with increasing speed the pressure is proportionately reduced until at normal running speed, it is reduced to an amount just sufficiently greater than the required actual holding pressure to give to the coupling the desired factor of safety. In other words, at rest, the total pressure on the coupling is the sum of the initial coupling pressure plus the maximum governor pressure, while at normal speed the pressure on the coupling is the safety pressure alone for which the coupling has been set. The maximum governor pressure is adjusted to a safe limit above the normal starting resistance, so that the coupling will not drive if, for any reason, the starting resistance exceeds this factor of safety. The main object of the invention is the production of an automatic slip coupling employing the principle just outlined, and with this and other objects not specifically mentioned in view, the invention consists in certain constructions and combinations which will be hereinafter fully described and then specifically set forth in the claims hereunto appended.

In the accompanying drawings, in which like characters of reference indicate the same or like parts, Fig. 1 is a side elevation, partly in longitudinal section, of an automatic slip coupling constructed in accordance with the invention; Fig. 2 is an end elevation of the coupling shown in Fig. 1, as seen from the line 2—2 of Fig. 1; Fig. 3 is a side elevation, partly in longitudinal section, of a modified form of automatic slip coupling embraced in the invention; and Fig. 4 is an end elevation of the coupling shown in Fig. 3, as seen from the line 4—4 in Fig. 3.

In carrying the invention into effect, there is provided a rotatory driving member, a rotatory driven member, member connecting means carried by one of said members and engaging the other, and automatic operating means for completely energizing the member connecting means to cause it to positively move said driven means under starting load and for partially de-energizing the same after starting to cause it to slip under abnormal load when running at normal coupling speed; all parts of the coupling are symmetrically arranged about a common axis in static and dynamic balanced relationship; there is provided a shaft to which the driven member is fast and about which all parts of the coupling are symmetrically arranged; the member connecting means includes a series of spring pressed pins longitudinally slidable in axial holes in one member and having tapered ends normally in engagement with tapered holes in the other member; there is further provided a spring compressing member engaging the pin springs and engaged by the energizing means; the energizing means includes spring actuating means operative under starting load and centrifugal actuating means operative at normal coupling speed. All of the foregoing parts may be varied in construction within the scope of the claims, for the specific structures selected to illustrate the invention are but two of many possible concrete embodiments of the same. The invention therefore is not to be restricted to the precise details of the structures shown and described.

Referring to Figs. 1 and 3, the driven member 5, which may be a gear, a sprocket, a pulley, or a cam, but is shown as a gear, is loosely mounted on a shaft 6 with one face of its hub in contact with the face of a collar 7 fast on the shaft 6. On its opposite face, the driven member 5 carries, or has integral with it, a disk 8 having a series of tapered holes 9 which are normally engaged by the tapered ends of pins 10 carried by the driving member 11 which is fast on the shaft 6. Springs 12 press the pins 10 toward the driven member 5. A spring compressing member 13 is loose on the shaft 6 and is provided with spurs 14 bearing against the springs 12 and is so adjusted that, at the normal speed of the shaft 6, the compression of the springs 12 allows the pins 10 to slip out of the holes 9 when the resistance of the load has reached the desired limit of safety. The pins 10, springs 12, and spring compressing member 13, constitute connecting means for the driving and driven members, and they may be carried by either member although shown as carried by the driving member.

At speeds below the normal running speed, the position of the member 13 is controlled by a centrifugal governor mounted on the shaft 6 and so adjusted that, at normal running speed, the position of the member 13 corresponds to the safety setting above referred to. At rest, however, the position of the member 13 due to this governor control is such that the springs 12 are at maximum compression, holding the pins 10 in engagement with sufficient pressure to prevent their slipping when starting, although the starting torque required is much greater than the desired safety limit of the running torque.

In the arrangement shown in Figs. 1 and 2, the governor weights 15 are carried by levers 16 fulcrumed on pins 17 carried by lugs 18 of a block 19 adjustably mounted on the shaft 6 and secured in adjusted position by a lock nut 20. The short ends of the levers 16 bear against the face of the spring compressing member 13 and thereby control its position. The springs 21 and the links 22 serve to equalize the effect of gravity on the two weights 15—15 when the shaft 6 is horizontal or inclined.

In the modification shown in Figs. 3 and 4, the governor weights 15 are mounted on rods 23 carried on forks 24 pivoted on studs 25 in lugs 26 of a block 27 mounted on the shaft 6. Each fork 24 carries a pin 28 on which is pivoted a rod 29 connecting it by means of a pin 30 with a lug 31 of the spring compressing member 13. The member 13 has a shouldered extension sleeve 32 surrounded by a coil spring 33 which bears against an adjustable block 34, mounted on the shaft 6, and is secured in its adjusted position by a lock nut 35.

Having the two independent sets of springs 12 and 21, or 12 and 33, as the case may be, the coupling, by suitable adjustment of the block 19 or 34, as the case may be, of the governor can be set to any desired safety pressure for starting as well as to any desired safety margin in running. If a jam occurs in a machine equipped with such a safety coupling, the machine automatically stops as soon as the safety running pressure of the coupling is exceeded and it cannot be restarted as long as the starting resistance remains higher than the safety starting pressure of the coupling.

In view of the foregoing, a detailed description of the operation of the device is deemed unnecessary and is therefore omitted in the interest of brevity.

What is claimed is:

1. An automatic slip coupling comprising a rotatory driving member, a rotatory driven member, member connecting means carried by one of said members in engagement with the other, and automatically operating means for completely energizing said member connecting means to cause it to positively move said driven member under starting load and for partially de-energizing the same after starting to cause it to slip under abnormal load when running at normal coupling speed, said member connecting means including a series of spring-pressed pins longitudinally slidable in axial holes in one member and having tapered ends normally in engagement with tapered holes in the other member.

2. An automatic slip coupling comprising a rotatory driving member, a rotatory driven member, member connecting means carried by one of said members in engagement with the other, and automatically operating means for completely energizing said member connecting means to cause it to positively move said driven member under starting load and for partially de-energizing the same after starting to cause it to slip under abnormal load when running at normal coupling speed, said member connecting means including pins and springs therefor longitudinally slidable in axial holes in one member and having tapered ends normally in engagement with tapered holes in the other member, and also including a spring compressing member engaging the pin springs and engaged by said energizing means.

3. An automatic slip coupling comprising a rotatory driving member, a rotatory driven member, member connecting means carried by one of said members in engagement with the other, and automatically operating means for completely energizing said member connecting means to cause it to positively move said driven member under starting load and for partially de-energizing the same after starting to cause it to slip under abnormal load when running at normal coupling speed, said energizing means including spring actuating means operative under starting load and centrifugal actuating means operative at normal coupling speed.

4. An automatic slip coupling comprising a rotatory driving member, a rotatory driven member, member connecting means carried by one of said members in engagement with the other, and automatically operating means for completely energizing said member connecting means to cause it to positively move said driven member under starting load and for partially de-energizing the same after starting to cause it to slip under abnormal load when running at normal coupling speed, said energizing means including connecting springs and centrifugal weights held inactive by spring action under starting load but overcoming said spring action at normal coupling speed.

5. An automatic slip coupling comprising a rotatory driving member, a rotatory driven member, member connecting means carried by one of said members in engagement with the other, and automatically operating means for completely energizing said member connecting means to cause it to positively move said driven member under starting load and for partially de-energizing the same after starting to cause it to slip under abnormal load when running at normal coupling speed, said energizing means including an adjustable block, levers fulcrumed on said block and engaging said member connecting means and carrying centrifugal weights, and springs connecting said weights.

6. An automatic slip coupling comprising a rotatory shaft, a driving member fast on said shaft, a driven member loose on said shaft, spring-actuated member connecting means carried by one member and engaging the other and also including a spring compressing member loose on said shaft, and automatically operating means carried by said shaft and completely energizing said member connecting means to cause it to positively move said driven member under starting load and to partially de-energize the same after starting to cause it to slip under abnormal load when running at normal coupling speed.

7. An automatic slip coupling comprising a rotary shaft, a driving member on said shaft and having a series of axial holes therethrough, a driven member loose on said shaft and having a corresponding series of tapered holes therein, a series of pins longitudinally slidable in the holes of said driving member and having tapered ends normally engaging the tapered holes in said driven member, springs pressing said pins towards said driven member, a spring compressing member loose on said shaft and engaging said springs, a block on said shaft, levers fulcrumed on said block and engaging said spring compressing member and carrying centrifugal weights, and springs connecting said weights.

In testimony whereof, I have signed my name to this specification.

LESTER FERENCI.